United States Patent
Liu

(10) Patent No.: US 10,386,065 B2
(45) Date of Patent: Aug. 20, 2019

(54) CONCENTRIC RESONATORS FOR MACHINES

(71) Applicant: DRESSER-RAND COMPANY, Olean, NY (US)

(72) Inventor: Zheji Liu, Olean, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 219 days.

(21) Appl. No.: 15/515,155

(22) PCT Filed: Sep. 18, 2015

(86) PCT No.: PCT/US2015/050839
§ 371 (c)(1),
(2) Date: Mar. 29, 2017

(87) PCT Pub. No.: WO2016/057186
PCT Pub. Date: Apr. 14, 2016

(65) Prior Publication Data
US 2017/0219207 A1    Aug. 3, 2017

Related U.S. Application Data

(60) Provisional application No. 62/061,223, filed on Oct. 8, 2014.

(51) Int. Cl.
*F23M 20/00* (2014.01)
*G10K 11/172* (2006.01)
(Continued)

(52) U.S. Cl.
CPC ............. *F23M 20/005* (2015.01); *F02C 7/24* (2013.01); *G10K 11/172* (2013.01); *F23R 2900/00014* (2013.01); *G10K 11/00* (2013.01)

(58) Field of Classification Search
CPC ......... G10K 11/00; G10K 11/172; F02C 7/24; F02M 20/004; F23R 2900/00014
(Continued)

(56) References Cited

U.S. PATENT DOCUMENTS 3,819,009 A     6/1974  Motsinger
7,278,514 B1 *  10/2007 Quigley ............ F16L 55/02781
                                                  181/212
(Continued)

FOREIGN PATENT DOCUMENTS

DE          19947938 A1    4/2001
EP          2952747 A1    12/2015
(Continued)

OTHER PUBLICATIONS

PCT International Search Report and Written Opinion dated Dec. 23, 2015 corresponding to PCT Application PCT/US2015/050839 filed Sep. 18, 2015.

*Primary Examiner* — Forrest M Phillips

(57) ABSTRACT

A system for attenuating acoustic energy in machines is provided. The system may include an inner tube disposed about a central axis, an outer tube disposed about the inner tube and the central axis, and a middle tube disposed about the central axis and between the inner tube and the outer tube. The system may also include a first annular ring extending radially from the outer tube and configured to couple the outer tube to the middle tube. The system may further include a second annular ring extending radially from the inner tube and configured to couple the inner tube to the outer tube, such that an acoustic resonator may be formed by the first annular ring, the second annular ring, a portion of the inner tube, a portion of the outer tube, and a portion of the middle tube.

19 Claims, 4 Drawing Sheets

(51) Int. Cl.
*F02C 7/24* (2006.01)
*G10K 11/00* (2006.01)

(58) Field of Classification Search
USPC .................................................. 181/175, 229
See application file for complete search history.

(56) References Cited

U.S. PATENT DOCUMENTS

| | | | | |
|---|---|---|---|---|
| 7,905,319 | B2* | 3/2011 | Sullivan | F01N 1/003 181/212 |
| 7,934,581 | B2* | 5/2011 | Kim | F04D 29/665 123/184.53 |
| 8,327,975 | B2* | 12/2012 | Ortman | F02B 33/44 123/184.53 |
| 8,408,357 | B2* | 4/2013 | Cheung | F02M 35/1216 123/184.53 |
| 8,485,311 | B2* | 7/2013 | Mackenzie | F02M 35/10137 123/184.21 |
| 2005/0034918 | A1 | 2/2005 | Bland et al. | |
| 2006/0225944 | A1 | 10/2006 | Abner et al. | |
| 2007/0169992 | A1 | 7/2007 | Wasif et al. | |
| 2010/0187038 | A1* | 7/2010 | Liu | F16L 55/052 181/233 |
| 2010/0193282 | A1* | 8/2010 | Kim | F04D 29/665 181/229 |
| 2010/0206664 | A1 | 8/2010 | Bagnall | |
| 2012/0181107 | A1 | 7/2012 | Hwang | |
| 2012/0292128 | A1 | 11/2012 | Keesser et al. | |
| 2014/0196978 | A1* | 7/2014 | Hartmann | F02M 35/1036 181/229 |
| 2016/0201621 | A1* | 7/2016 | Grieswald | F16L 55/033 181/229 |

FOREIGN PATENT DOCUMENTS

| | | |
|---|---|---|
| FR | 2216445 A1 | 8/1974 |
| GB | 1507663 A | 4/1978 |

* cited by examiner

CONCENTRIC RESONATORS FOR MACHINES

BACKGROUND

This application claims priority to U.S. Provisional Patent Application having Ser. No. 62/061,223, which was filed Oct. 8, 2014. The aforementioned patent applications are hereby incorporated by reference in their entirety into the present application to the extent consistent with the present application.

Machines, such as engines and compressors, are used in a variety of industries where it is desirable to force a fluid into or out of a chamber by changing the volume of the chamber. For example, in an oil refinery, one type of compressor, referred to as a screw compressor, utilizes a rotary type of positive displacement mechanism to produce a compressed fluid. Such compressors typically include conduits or pathways through which a fluid flows during operation. Generating the fluid flow therethrough and compressing or otherwise processing the fluid typically leads to the generation of noise or acoustic energy. It may be desirable to attenuate this acoustic energy since the acoustic energy may cause undesirable vibrations and structural failures.

Accordingly, silencers are often used in machines to reduce pressure pulsations, vibrations, and noise. For example, with respect to a screw compressor, silencers may be disposed at the inlet and outlet thereof to reduce the generated noise. While the silencers may be useful for lowering noise emissions, some machines may generate large amounts of noise not fully attenuated by the silencers as the fluid flows therethrough. This excess acoustical energy may be undesirable in certain applications, particularly in environments where operators are present.

Accordingly, there exists a need for systems capable of attenuating acoustical energy generated by machines to address these drawbacks.

SUMMARY

Embodiments of the disclosure may provide a system for attenuating acoustic energy. The system may include an inner tube having an inner tube annular wall disposed about a central axis and defining an annular passageway. The system may also include an outer tube having an outer tube annular wall disposed about the inner tube and the central axis. The system may further include a middle tube having a middle tube annular wall disposed about the central axis and between the inner tube annular wall and the outer tube annular wall. The system may also include at least one first annular ring extending radially from the outer tube annular wall and configured to couple the outer tube annular wall to the middle tube annular wall. The system may further include at least one second annular ring extending radially from the inner tube annular wall and configured to couple the inner tube annular wall to the outer tube annular wall, such that an acoustic resonator may be formed by the at least one first annular ring, the at least one second annular ring, a portion of the inner tube annular wall, a portion of the outer tube annular wall, and a portion of the middle tube annular wall.

Embodiments of the disclosure may further provide another system for attenuating acoustic energy. The system may include a first tube having a first annular wall defining at least one aperture and being configured to receive a fluid flowing therethrough along a central axis. The system may also include a second tube disposed about and concentric with the first tube and having a second annular wall, such that the first annular wall and the second annular wall may form a channel therebetween and approximately parallel to the central axis and adjacent the at least one aperture. The system may further include a third tube disposed about and concentric with the second tube and having a third annular wall, such that the first annular wall, the second annular wall, and the third annular wall form a chamber. The system may also include at least one annular ring disposed within the chamber and configured to separate the chamber into at least two acoustic resonators.

Embodiments of the disclosure may further provide another system for attenuating acoustic energy. The system may include a first tube disposed about a central axis, an outer tube disposed about the first tube and the central axis, and at least one annular ring radially disposed about the central axis and coupling the first tube and the outer tube to form an intermediate structure. The intermediate structure may be configured to couple with an inner tube to form two or more acoustic resonators disposed about the central axis.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
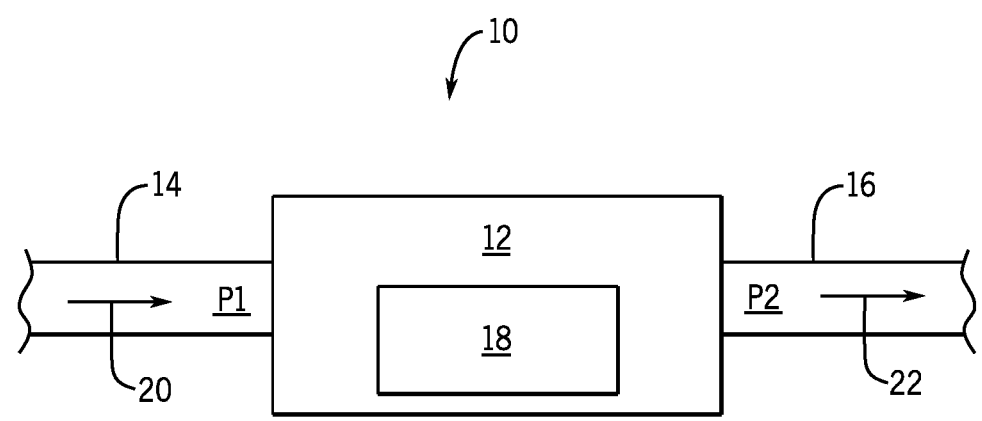
FIG. 1 is a schematic illustrating a system for attenuating acoustic energy in accordance with a disclosed embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

As described in more detail below, provided herein are systems and methods for attenuating acoustic energy when such energy is generated or present and undesired. The acoustic energy attenuation systems may be employed in combination with devices or systems through which fluid is adapted to flow, such as, for example, screw compressors or other positive displacement machines. Some embodiments provided herein include an array of concentric Helmholtz resonators. Each concentric Helmholtz resonator may include a chamber and a neck, such that each concentric Helmholtz resonator may reduce the acoustic energy entering the chamber reactively and dissipatively, thus reducing the acoustical energy emanating from the machine. The disclosed acoustic energy attenuation devices may be positioned anywhere on or in the machine such that the energy attenuation devices are capable of attenuating the acoustic energy. For example, in one embodiment, a concentric Helmholtz resonator may be located on a discharge nozzle of a screw compressor. These and other features of the disclosed embodiments are discussed in more detail below.

Turning now to the drawings, in one embodiment, as illustrated in FIG. 1, a fluid compression system 10 includes a fluid compression device 12 positioned between and coupled to an inlet conduit 14 and an outlet conduit 16. One or more acoustic resonators 18 may be formed in and/or coupled to the fluid compression device 12 and/or one or more components thereof. For example, in one embodiment, the fluid compression device 12 may be a screw compressor, and the acoustic resonators 18 may be coupled to a discharge nozzle or suction plenum. For further example, the acoustic resonators 18 may be a concentric Helmholtz resonator assembly disposed circumferentially about the discharge nozzle of the screw compressor.

During operation, in one embodiment, the fluid compression device 12 receives a fluid at a pressure P1 via the inlet conduit 14, and then compresses the fluid such that the fluid exits the fluid compression device 12 and enters the outlet conduit 16 at a pressure P2, which is greater than the pressure P1. Arrows 20 and 22 indicate the direction of this fluid flow from the inlet conduit 14, through the fluid compression device 12, and into the outlet conduit 16.

In some embodiments, during its operation, the fluid compression device 12 is a noise source generating acoustic energy, or noise, and producing a noise level. In these embodiments, the acoustic resonators 18 attenuate the acoustic energy generated by the operation of the fluid compression device 12, thereby reducing the noise level produced by the fluid compression device 12. In some embodiments, the attenuation of the acoustic energy by the acoustic resonators 18 reduces the risk of structural failure due to vibrations and/or other types of dynamic and/or vibratory loading, within and/or relatively proximate the fluid compression device 12 and/or the inlet and outlet conduits 14 and 16. Moreover, the attenuation of acoustic energy by the acoustic resonators 18 may reduce the risk that one or more of the fluid compression device 12, the inlet conduit 14, and the outlet conduit 16 will become a noise nuisance during the operation of the fluid compression device 12.

It should be noted that the fluid compression device 12 shown in FIG. 1 is merely an example of one type of machine with which the acoustic resonators 18 may be utilized. However, in other embodiments, the acoustic resonators 18 disclosed herein may be utilized with any machine that generates or is associated with undesired acoustic energy, such as, but not limited to, compressors and gas turbines. For example, in another embodiment, the acoustic resonators 18 may be utilized with a fluid expansion device that operates to reduce a pressure at an inlet conduit to a lesser pressure at an outlet conduit. In such embodiments, the acoustic resonators 18 disclosed herein may be located anywhere in, on, or near the fluid expansion device for the purpose of attenuating undesired acoustic energy generated by or present in the fluid expansion device. Indeed, the following discussion of the acoustic resonators 18 in the context of the fluid compression system 10 is merely one example of the presently contemplated uses of the disclosed embodiments.

Figure 2:
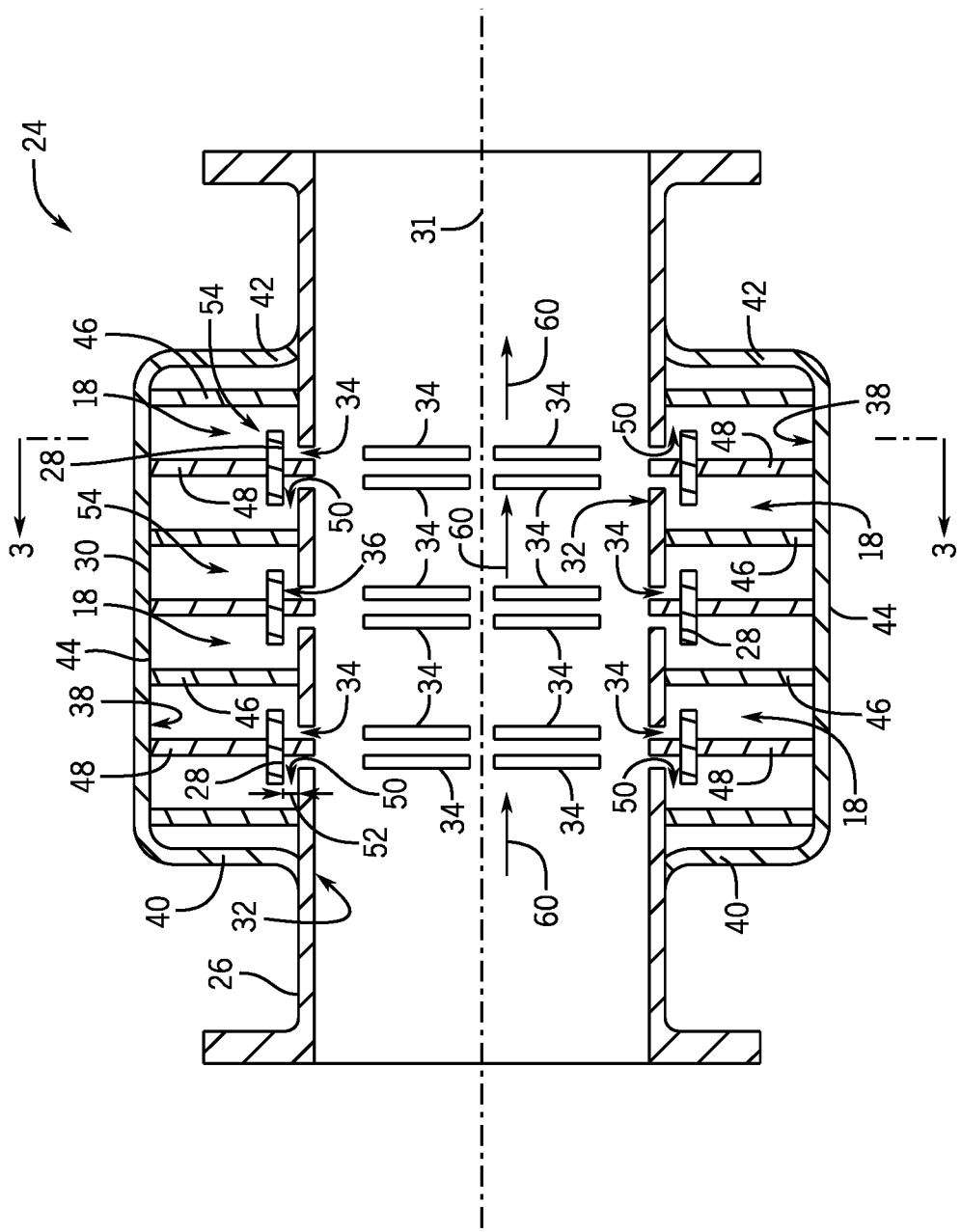
FIG. 2 illustrates a cross sectional view of a device for attenuating acoustic energy in accordance with a disclosed embodiment.
Figure 3:
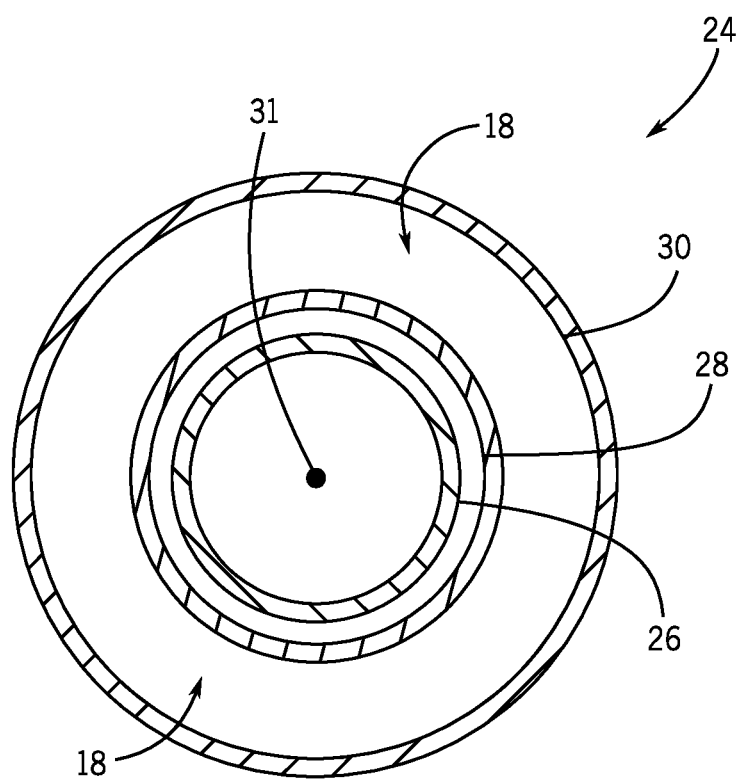
FIG. 3 illustrates a cross sectional view taken along line 3-3 of the device of FIG. 2 in accordance with a disclosed embodiment.

While continuing reference to FIG. 1, FIGS. 2 and 3 illustrate an embodiment of a concentric resonator array 24 including a plurality of the acoustic resonators 18 arranged concentrically about an inner tube 26. In the illustrated embodiment, a middle tube 28 is disposed concentrically about the inner tube 26, and an outer tube 30 is disposed concentrically about the middle tube 28. That is, in the embodiment of FIGS. 2 and 3, each of the tubes 26, 28, and 30 is disposed about a common central axis 31.

Depending on the implementation in which the concentric resonator array 24 is employed, the inner tube 26 and the common central axis 31 may be portions of the fluid compression device 12 or the inlet and outlet conduits 14 and 16. For example, in one embodiment, the fluid compression device 12 may be a screw compressor in an oil refinery plant. In this embodiment, the inner tube 26 may be a discharge nozzle of the screw compressor, and the common central axis 31 may be a central axis of the discharge nozzle of the screw compressor. However, in other embodiments, the inner tube 26 may be formed from any other portion of the fluid compression device 12 or may be provided as an addition to the fluid compression device 12, depending on the given application.

Further, in the illustrated embodiment, the inner tube 26 includes an inner tube annular wall 32 defining one or more apertures or openings 34, the outer tube 30 includes an outer tube annular wall 38, and the middle tube 28 includes a middle tube annular wall 36 disposed about the inner tube annular wall 32. In the illustrated embodiment, the outer tube 30 includes the outer tube annular wall 38 disposed about the inner tube and middle tube annular walls 32 and 36. In this embodiment, the outer tube annular wall 38 includes a first end portion 40, a second end portion 42, and a middle portion 44 disposed between the first and second end portions 40 and 42. In some embodiments, the first end portion 40 and/or the second end portion 42 may be configured such that the first end portion 40 and/or the second end portion 42 of the outer tube annular wall 38 may couple with the inner tube 26.

Still further, in the illustrated embodiment, a plurality of first annular rings 48 couple the outer tube 30 to the middle tube 28, and a plurality of second annular rings 46 couple the outer tube 30 to the inner tube 26. The second annular rings 46 and/or the first annular rings 48 may be disposed approximately perpendicular (i.e., 90° or within 5%, within 1%, within 0.1%, or within 0.01% of 90°) to the central axis 31 in some embodiments. In certain embodiments, the second annular rings 46 may be welded to the outer tube 30 and/or to the inner tube 26 to form one or more weld joints that couple the second annular rings 46 to the inner and outer tubes 26 and 30. Similarly, in some embodiments, the first annular rings 48 may be welded to the outer tube 30 and/or to the middle tube 28 to form one or more weld joints that couple the first annular rings 48 to the middle and outer tubes 28 and 30. Additionally, the first end portion 40 and/or the second end portion 42 of the outer tube annular wall 38 may be welded to the inner tube 26 to couple the outer tube 30 to the inner tube 26 via one or more weld joints at either end of the outer tube annular wall 38. However, it should be noted that welding is merely one example of a suitable way to couple one or more of the components together, and presently contemplated embodiments are not limited to being coupled together via welding. Indeed, any suitable technique for coupling the components may be utilized in other embodiments.

In some embodiments, a portion of the inner tube annular wall 32 and a portion of the middle tube annular wall 36 may define one or more necks or channels 50 that enable acoustic energy to enter the acoustic resonators 18. In some embodiments, the channels 50 may be approximately parallel (i.e., 180° or within 5%, within 1%, within 0.1%, or within 0.01% of 180°) to the central axis 31. In certain embodiments, a width 52 of the neck 50 may be substantially smaller than the diameter of one of the second annular rings 46 and/or one of the first annular rings 48. For example, in one embodiment, the width 52 of the neck 50 may be less than approximately 10% of the diameter of one of the second annular rings 46.

In the illustrated embodiment, each of the acoustic resonators 18 disposed along the middle portion 44 of the outer tube annular wall 38 is formed by one of the second annular rings 46, one of the first annular rings 48, a portion of the inner tube annular wall 32, a portion of the middle tube annular wall 36, and a portion of the outer tube annular wall 38.

Further, each acoustic resonator 18 may include a chamber 54. One or more of the dimensions of the chambers 54 may be varied in different embodiments, depending on implementation-specific considerations. For example, in some embodiments, the volume of the chambers 54 may be substantially uniform in each of the acoustic resonators 18 in the concentric resonator array 24 along the length of the inner tube 26. However, in other embodiments, the volume of the chambers 54 in the concentric resonator array 24 may be varied in the acoustic resonators 18 along the length of the inner tube 26, as shown in the embodiment of FIG. 2. Indeed, the size, shape, patterns, and other standalone or relative dimensions of the acoustic resonators 18 may vary in different embodiments and are not limited to those shown and described herein.

Further, in the embodiment illustrated in FIG. 2, six acoustic resonators 18 are shown concentrically disposed about the circumference of the inner tube 26. However, in other embodiments, any number of desired acoustic resonators 18 may be provided, depending on implementation-specific considerations, such as the amount of noise attenuation desired, availability of materials or space within the system, and so forth. Additionally, in certain embodiments, the first end portion 40 and/or the second end portion 42 of the outer tube annular wall 38 may be replaced by one of the second annular rings 46 positioned substantially perpendicular to the central axis 31, for example, to form substantially uniform acoustic resonators 18 along the length of the inner tube 26. Still further, in some embodiments, the first and second annular rings 48 and 46 may be provided at a variety of suitable angles to the central axis 31, not limited to perpendicular angles.

During operation of the embodiment of FIG. 2, a fluid (e.g., compressed fluid) flows through the inner tube 26 in the direction indicated by arrows 60. The acoustic resonators 18 located along the fluid flow path operate as an array of resonators (e.g., Helmholtz resonators) that attenuate acoustic energy present in or generated by the system to which the concentric resonator array 24 is coupled. In one embodiment, each of the acoustic resonators 18 behaves like a dead or substantially dead volume to the flow through the inner tube 26, but is at least partially transparent to acoustic energy or noise, for example, by receiving acoustic energy into the chambers 54 via the necks 50. After entering the acoustic resonators 18 via the necks 50, the sound waves of the acoustic energy oscillate within the chambers 54, and the acoustic energy is dissipated. Accordingly, the concentric resonator array 24 may be positioned near, on, or in one or more noise sources within the system, for example, close to a screw compressor in an oil refinery system.

Figure 4:
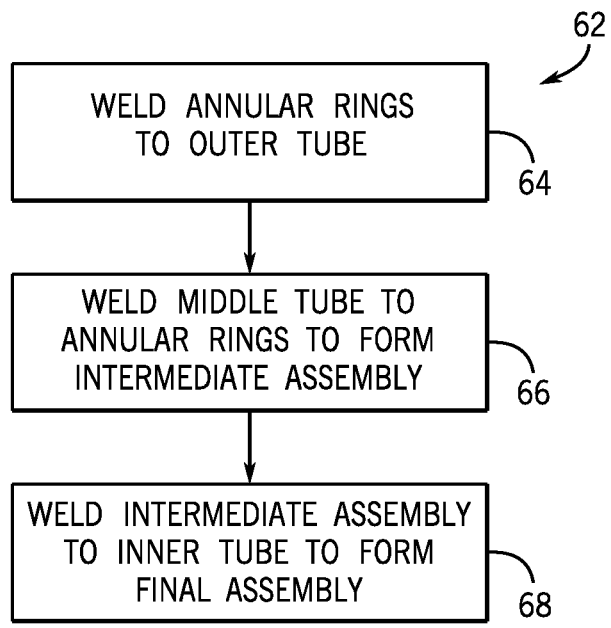
FIG. 4 is a flow chart illustrating a method for manufacturing a device for attenuating acoustic energy in accordance with an embodiment.

The concentric resonator array 24 of FIGS. 2 and 3 may be manufactured or formed in any suitable manner, depending on desired features of the implementation. However, in one embodiment, the concentric resonator array 24 may be formed in accordance with a method 62 shown in FIG. 4. The illustrated embodiment of the method 62 for manufacturing the concentric resonator array 24 includes welding the second annular rings 46 and/or the first annular rings 48 to the outer tube 30 (block 64). The method 62 further includes welding the middle tube 28 to the first annular rings 48 to form an intermediate assembly (block 66). It should be noted that the intermediate assembly is subject to implementation-specific variations and may be formed from any desired combination of components, including two or more of the outer tube 30, one or more of the second annular rings 46, one or more of the first annular rings 48, the middle tube 28, or any desired combination of these components. For example, in one embodiment, the intermediate assembly may include the outer tube 30 and one or more of the second annular rings 46. For further example, in another embodiment, the intermediate assembly may include the outer tube 30, one or more of the second annular rings 46, and one or more of the first annular rings 48. Still further, in another embodiment, the intermediate assembly may include the outer tube 30, one or more of the second annular rings 46, one or more of the first annular rings 48, and the middle tube 28.

The method 62 further includes welding the intermediate assembly to the inner tube 26 to form the final assembly (block 68). In some embodiments, the intermediate assembly may be formed at a manufacturing facility separate from the facility in which the concentric resonator array 24 is utilized. For example, the intermediate assembly may be formed in a manufacturing plant and transported to an oil refinery for installation near, on, or in a screw compressor. In such embodiments, the intermediate assembly may be formed remote from the use location but welded or otherwise coupled to the inner tube 26 at the use location. Further, in some embodiments, the intermediate assembly may be provided as a retrofit or other type of kit that includes preformed components designed for assembly and installation at the use location. For example, the outer tube 30, the middle tube 28, the second annular rings 46, and the first annular rings 48 may be provided as a kit, and a user at the use location may weld the components together to form the concentric resonator array 24 at the use location. In such embodiments, the inner tube 26 may form a portion of the concentric resonator array 24, but may be provided separately at the use location.

In other embodiments, the inner tube 26 may be provided as a part of the concentric resonator array 24 during manufacturing. For example, the inner tube 26 may be sized and shaped to be compatible with a conduit carrying fluid at the use location. The concentric resonator array 24 may then be coupled with the conduit at the use location, for example, by welding the ends of the inner tube 26 to the conduit such that the inner tube 26 is aligned with the conduit carrying the fluid.

Figure 5:
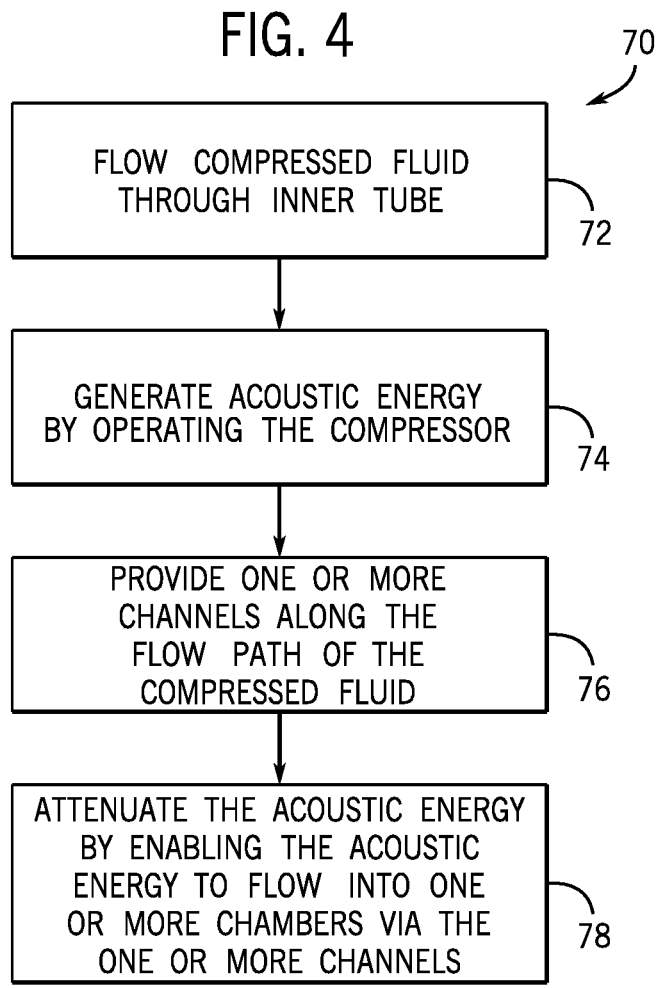
FIG. 5 is a flow chart illustrating a method for attenuating acoustic energy in accordance with an embodiment.

FIG. 5 illustrates an embodiment of a method 70 for attenuating acoustic energy of a compressor using the concentric resonator array 24. The method 70 includes flowing a compressed fluid through the inner tube 26 (block 72). For example, in one embodiment, the inner tube 26 may be a discharge nozzle of a screw compressor in an oil refinery plant. For further example, in other embodiments, the fluid flowing through the inner tube 26 may not be a compressed fluid. In such instances, the fluid may be associated, for example, with a fluid expansion, rather than compression, device. In these embodiments, the acoustic resonators 18 may be located anywhere in, on, or near the fluid expansion device suitable to attenuate the noise generated by or present in the system.

However, in the illustrated embodiment in which the fluid is a compressed fluid, the method 70 further includes generating acoustic energy by operating the compressor (block 74). One or more channels 50 are provided along the flow path of the compressed fluid (block 76), and the acoustic energy is attenuated by enabling the sound waves to flow into the chambers 54 via the one or more channels 50 (block 78).

The foregoing embodiments disclosed herein provide concentric resonators for use with a variety of types of machines. For example, one disclosed embodiment provides concentric Helmholtz resonators for use on a discharge nozzle of a screw compressor. The provided concentric resonators may enable a reduction in the noise or vibrations associated with operation of such machines by attenuating acoustic energy generated by or present in the machine.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A system for attenuating acoustic energy, comprising:
an inner tube comprising an inner tube annular wall disposed about a central axis and defining an annular passageway;
an outer tube comprising an outer tube annular wall disposed about the inner tube and the central axis;
a middle tube comprising a middle tube annular wall disposed about the central axis and between the inner tube annular wall and the outer tube annular wall;
at least one first annular ring extending radially from the outer tube annular wall and configured to couple the outer tube annular wall to the middle tube annular wall; and
at least one second annular ring extending radially from the inner tube annular wall and configured to couple the inner tube annular wall to the outer tube annular wall, wherein an acoustic resonator is formed by the at least one first annular ring, the at least one second annular ring, a portion of the inner tube annular wall, a portion of the outer tube annular wall, and a portion of the middle tube annular wall.

2. The system of claim 1, wherein the inner tube annular wall defines at least one opening configured to enable the acoustic energy to enter the acoustic resonator via a neck formed between the inner tube annular wall and the middle tube annular wall.

3. The system of claim 2, wherein a width of the neck is less than approximately ten percent of a diameter of the at least one second annular ring.

4. The system of claim 1, wherein the at least one second annular ring is welded to the inner tube annular wall and the outer tube annular wall, and the at least one first annular ring is welded to the outer tube annular wall and the middle tube annular wall.

5. The system of claim 1, wherein the at least one second annular ring is disposed substantially perpendicular to the central axis.

6. The system of claim 1, wherein the inner tube is configured to fluidly couple with a discharge nozzle of a screw compressor, thereby providing a flow path for a compressed fluid through the annular passageway along the central axis.

7. The system of claim 1, wherein the outer tube annular wall comprises an end portion configured to couple with the inner tube annular wall.

8. The system of claim 7, wherein the end portion of the outer tube annular wall is coupled to the inner tube annular wall via welding.

9. A system for attenuating acoustic energy, comprising:
a first tube comprising a first annular wall defining at least one aperture and being configured to receive a fluid flowing therethrough along a central axis;
a second tube disposed about and concentric with the first tube and comprising a second annular wall, wherein the first annular wall and the second annular wall form a channel therebetween and approximately parallel to the central axis and adjacent the at least one aperture;
a third tube disposed about and concentric with the second tube and comprising a third annular wall, wherein the first annular wall, the second annular wall, and the third annular wall form a chamber; and at least one annular ring disposed within the chamber and configured to separate the chamber into at least two acoustic resonators.

10. The system of claim 9, wherein the at least one annular ring is coupled to the third annular wall via a weld joint.

11. The system of claim 9, wherein the third annular wall is coupled to the first annular wall via a first end portion and a second end portion of the third annular wall.

12. The system of claim 11, wherein the third annular wall is coupled to the first annular wall via respective weld joints at the first end portion and the second end portion.

13. The system of claim 9, wherein the first tube is configured to fluidly couple with a discharge nozzle of a screw compressor.

14. The system of claim 9, wherein the second tube is directly coupled to the at least one annular ring.

15. A system for attenuating acoustic energy, comprising:
a first tube disposed about a central axis;
an outer tube disposed about the first tube and the central axis; and
at least one annular ring radially disposed about the central axis and coupling the first tube and the outer tube to form an intermediate structure, wherein the intermediate structure is configured to couple with an inner tube to form two or more acoustic resonators disposed about the central axis,
wherein a channel is formed between a portion of the first tube and a portion of the inner tube, and the channel is configured to enable the acoustic energy to enter at least one of the two or more acoustic resonators.

16. The system of claim 15, comprising at least one additional annular ring coupling the outer tube and the inner tube.

17. The system of claim 15, wherein the intermediate structure is configured to couple with the inner tube via a first weld joint coupling a first end portion of an annular wall of the outer tube to an annular wall of the inner tube.

18. The system of claim 16, wherein the intermediate structure is configured to couple with the inner tube via a second weld joint coupling a second end portion of the annular wall of the outer tube to the annular wall of the inner tube.

19. The system of claim 15, wherein the two or more acoustic resonators comprise Helmholtz resonators.

* * * * *